Aug. 4, 1959 E. B. NOLT ET AL 2,897,748
HAY BALER
Filed March 26, 1957 2 Sheets-Sheet 1
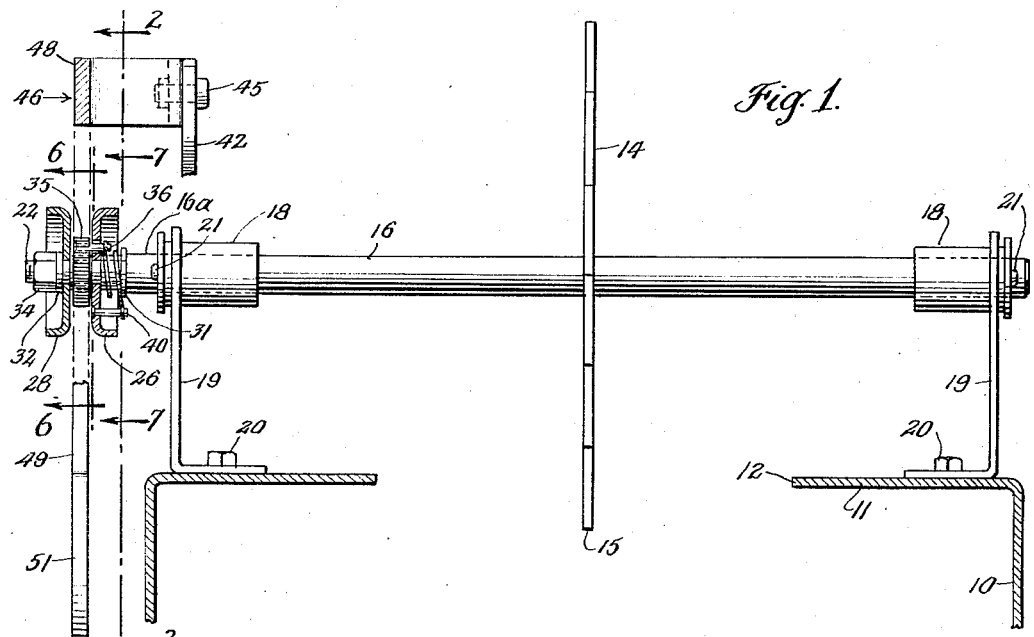
Fig. 1.
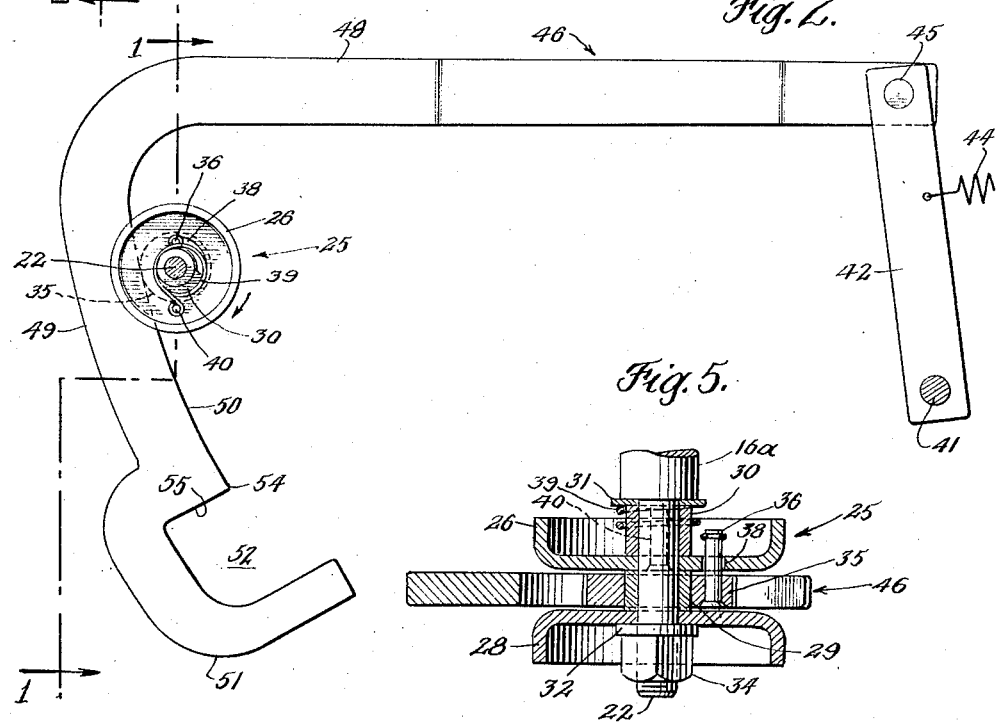
Fig. 2.
Fig. 5.
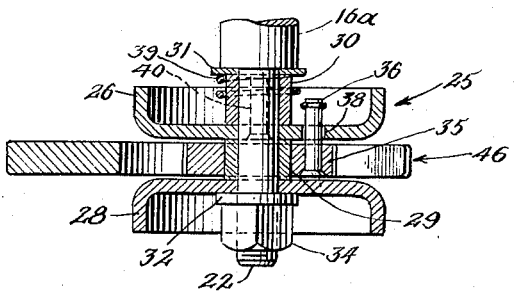
INVENTORS
EDWIN B. NOLT
AND EUGENE J. HAUPT
Joseph Allen Brown
ATTORNEY Aug. 4, 1959  E. B. NOLT ET AL  2,897,748
HAY BALER
Filed March 26, 1957  2 Sheets-Sheet 2
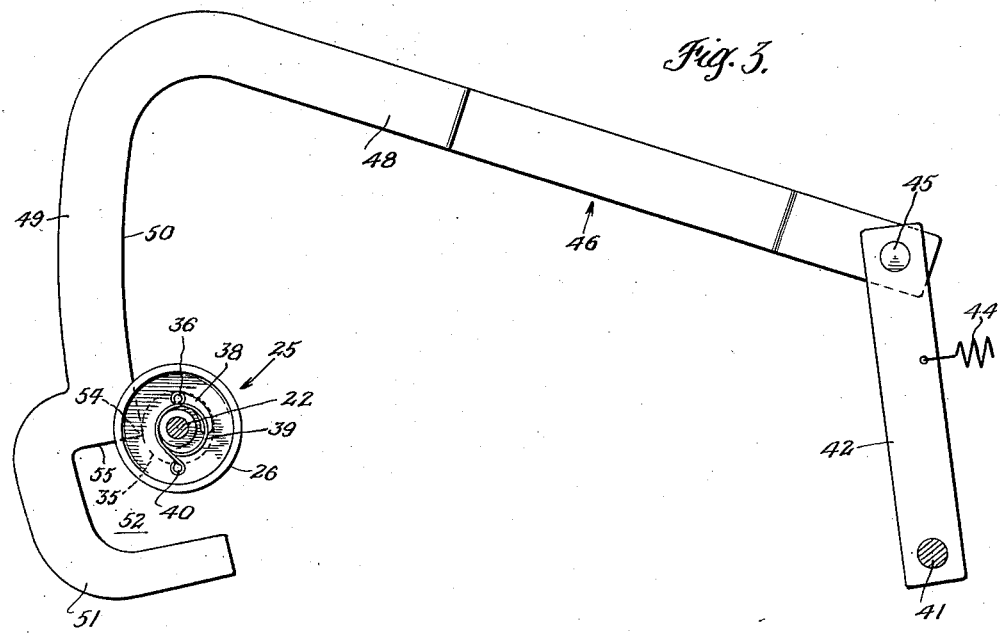
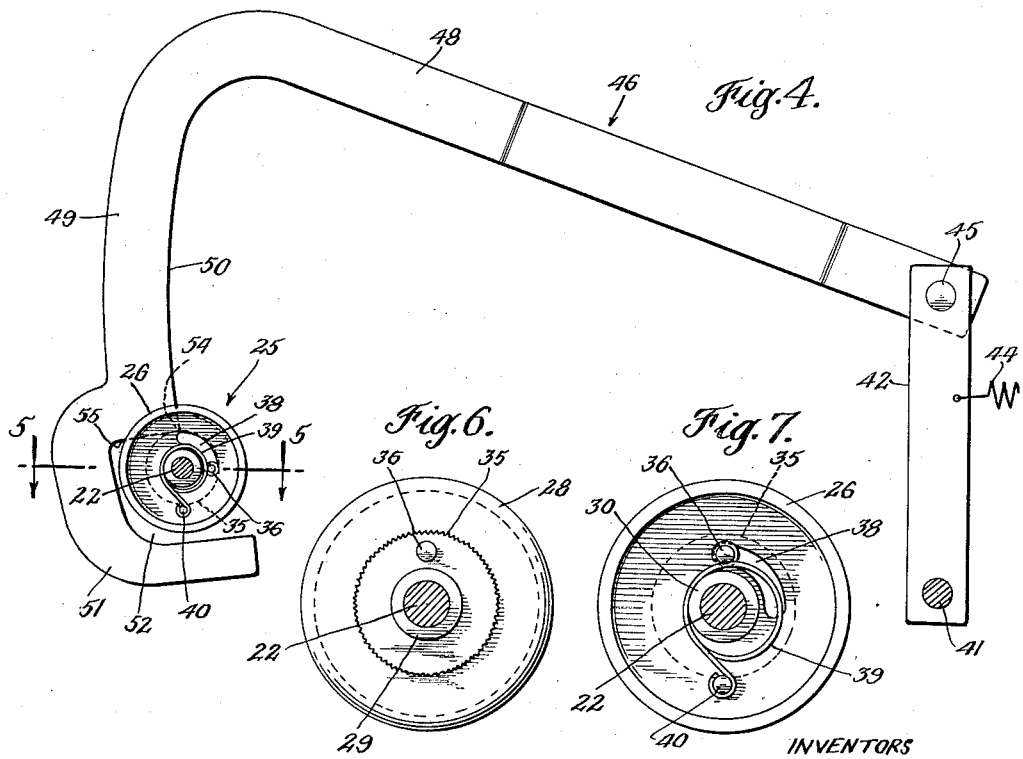
INVENTORS
EDWIN B. NOLT
AND EUGENE J. HAUPT
Joseph Allen Brown
ATTORNEY United States Patent Office 2,897,748
Patented Aug. 4, 1959

2,897,748

HAY BALER

Edwin B. Nolt, New Holland, and Eugene J. Haupt, Lancaster, Pa., assignors to Sperry Rand Corporation, New Holland, Pa., a corporation of Delaware Application March 26, 1957, Serial No. 648,526

3 Claims. (Cl. 100—4)

The present invention relates generally to hay balers of the type having means for automatically instituting the operation of a tying mechanism upon completion of each bale. More specifically, the invention relates to an improved trip mechanism for actuating the tying mechanism.

In conventional hay balers, cut and windrowed hay is picked up and conveyed in successive charges into a bale case. Each charge is compressed by a plunger reciprocable in the case. As each bale takes form, it is progressively forced rearwardly in the bale case and a metering wheel is rotative responsive to such progressive movement. The metering wheel is carried on a shaft and is suitably connected thereto so that when the wheel rotates, the shaft is also rotated. Such shaft functions, through the medium of a trip arm, to actuate the tying mechanism.

In well known prior art balers, the knotter is actuated by means of a spring-biased L-shaped trip arm having a generally U-shaped pocket at one end. A roller carried on the metering wheel shaft causes the trip arm to pivot as a bale is formed; and, when a desired length of bale has been reached, the roller and trip arm pocket come into register, whereupon the trip arm shifts under its biasing force to actuate the knotter and the roller drops into the pocket.

While such mechanism functions well, the parts are subjected to rugged action and wear, particularly on the roller and around the U-shaped pocket in the trip arm.

One of the primary objects of this invention is to provide an improved structure which will result in increased wear life of the parts involved.

Another object of this invention is to provide an improved roller construction which will give a more positive drive for the trip arm.

A further object of this invention is to provide an improved roller which can be manufactured at little increase in cost over the rollers heretofore employed.

Other objects of this invention will be apparent hereinafter from the specification and from the recital in the appended claims.

In the drawings:

Fig. 1 is a fragmentary sectional view of a bale case having mounted thereon a metering mechanism and a trip assembly including an improved roller constructed according to one embodiment of this invention. This section is taken generally on the lines 1—1 of Fig. 2 and looking in the direction of the arrows;

Fig. 2 is a section taken on the line 2—2 of Fig. 1 and looking in the direction of the arrows, and showing the trip arm of the mechanism in an at-rest position or at the beginning of a bale forming operation;

Figs. 3 and 4 are views similar to Fig. 2 showing the trip arm about to be tripped and then tripped, respectively;

Fig. 5 is a section taken on the line 5—5 of Fig. 4 and looking in the direction of the arrows; and Figs. 6 and 7 are sections taken on the lines 6—6 and 7—7 of Fig. 1, respectively, and looking in the direction of the arrows.

Referring now to the drawings by numerals of reference, 10 denotes a bale case or chamber having a top wall 11 provided with a slot 12 through which a metering wheel 14 projects. The metering wheel has teeth 15 which extend into the bale case a sufficient distance to engage the top of the bale being formed therein. As the bale is formed, it is moved longitudinally through the bale chamber from a forward and toward a rearward end thereof thereby causing wheel 14 to be rotated.

The metering wheel 14 is affixed to a shaft 16 rotatable in bearings 18—18 on brackets 19—19. Brackets 19 seat on top wall 11 of the bale case and are connected thereto by bolts 20—20. Cotter pins 21—21 prevent longitudinal movement of shaft 16 while permitting it to rotate freely in bearings 18 responsive to rotation of the metering wheel 14.

Shaft 16 has a portion 16a at one end (Figs. 1 and 5) which extends beyond the adjacent bracket 19, such portion including a terminal section 22 of reduced diameter. Mounted on section 22 is a roller 25 which constitutes the improvement of this invention. Roller 25 comprises a pair of cup-like members 26 and 28, and spacers 29 and 30. These parts are clamped between a washer 31 interposed between spacer 30 and shaft portion 16a, and a washer 32, abutting against cup member 28, by means of a nut 34 threaded onto the terminal section 22. It will be apparent that when nut 34 is threaded down tightly, roller 25 and shaft 16 will rotate together.

Freely rotatable on spacer 29 is a drive wheel 35 having a roughened or knurled periphery. The thickness of the wheel is less than the length of spacer 29, thereby providing a clearance between the sides of the wheel and the inner faces of cup members 26—28. Wheel 35 has a pin 36 riveted to it. This pin projects laterally and through an arcuate slot 38 in member 26. Slot 38 covers an arc of approximately 90 degrees and is concentric with the rotational axis of shaft 16. Connected to pin 36 is one end of a torsional spring 39 which winds around spacer 30 and is connected to a pin 40 riveted to a member 26.

Pivoted at 41 to the bale case is a lever 42 biased in a clockwise direction when viewed as shown in Figs. 2–4 by a spring 44. Pivotally connected at 45 to lever 42 is a trip arm 46 which is generally L-shaped. A portion 48 of the trip arm extends longitudinally of the bale case 10, while a portion 49 extends vertically relative thereto. Portion 49 extends between cup members 26—28 of roller 25. It has a face 50 which engages the knurled periphery of drive wheel 35.

At its free end 51, trip arm 46 is of U-shaped configuration forming a pocket 52 and a sharp drop-off point 54.

In operation, the bale being formed in bale case 10 and moving rearwardly therein (from right to left, Figs. 2–4) rotates metering wheel 14 and shaft 16 clockwise. The rotation of shaft 16 causes roller 25, affixed to it, to similarly rotate. Roller 25 in turn causes the drive wheel 35 to rotate, member 26 of the roller engaging pin 36 affixed to the drive wheel and the pin assuming a position at one end of the slot 38 (Figs. 2 and 3). As wheel 35 rotates, its knurled periphery engages edge 50 of trip arm 46 causing the trip arm to be elevated and pivoted about point 45. All the while, spring 44 exerts a biasing force on the trip arm toward the right of Fig. 2. However, the trip arm is unable to move to the right because of its engagement with the periphery of wheel 35. As the bale is formed in the bale case, the pocket 52 at the end of the trip arm approaches roller 25; and, when the last charge of hay has been delivered to complete the bale, the parts of the device are disposed as shown in Fig. 3, with point 54 and wheel 35 in engagement.

At this stage, spring 44 is able to become effective to pull lever 42 and trip arm 46 to the right. As trip arm 46 snaps forwardly, or longitudinally to the right, the U-shaped portion 51 of the trip arm straddles roller 25, the upper side edge 55 of pocket 52 engaging drive wheel 35 and causing it to over-run roller 25, shaft 16, and metering wheel 14. When wheel 35 over-runs, pin 36 moves to the opposite end of slot 38 against the resistance of torsion spring 39, or from the positions shown in Fig. 3 to the position shown in Fig. 4. This over-running of the wheel 35 places the torsional spring under load.

Conventional mechanism, not shown, pivots lever 42 counter-clockwise to re-set the device and return the parts to the position shown in Fig. 2. During re-setting the trip arm is moved away from the periphery of drive wheel 35. When it is freed, spring 39 spins the wheel 35 one-fourth revolution to bring pin 36 back to the proper end of slot 38.

Heretofore, roller structures not having the over-running feature have resulted in more rapid wear around point 54 and the knurling on wheel 35 than is desired. This is because in previous structures, the drive wheel, roller, and shaft were fixed relative to each other, and once the trip arm pocket was reached, the knurled periphery of the wheel engaged the drop-off point and the parts slid relative to each other, rather than a rolling action as provided herein. The surface 55 sliding against the periphery of the wheel tended to wear away the knurled surface. Further, the drive wheel acted much as a file, wearing down point 54 and edge 55. If wheel 35 becomes worn beyond a certain point, it slips on edge 50 of the trip arm rather than providing a positive vertical movement of the trip arm. This slipping impairs the accuracy of the metering.

While not shown here, it is the pivoting of lever 42 which actuates the tying mechanism. The structure interconnected between lever 42 and the tier is conventional.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

Having thus described our invention, what we claim is:

1. In an automatic hay baler, a bale case through which bales are progressively moved as they are formed, a shaft, a metering wheel fixedly mounted on said shaft and projecting into said bale case, said shaft and metering wheel being rotatable responsive to bale movement, a movable trip arm, a drive wheel mounted on said shaft and engaging said trip arm, means connecting said drive wheel to said shaft whereby the drive wheel may rotate with the shaft and impart movement to said trip arm and may over-run said shaft, said last named means comprising a pair of cup-shaped members fixedly mounted on said shaft, a spacer separating said members, said drive wheel being freely rotatable on said spacer, one member of said pair of members having an arcuate slot concentric to the rotational axis of said shaft, a pin on said drive wheel projecting through said slot, said drive wheel being rotatable relative to said shaft until the pin thereon assumes a position in one end of said slot on rotation of the shaft, being free, however, to over-run the shaft an amount equal to the movement of said pin to the end of said slot opposite said one end, and a torsion spring interposed between said drive wheel and one of said pair of members operative to store energy when said drive wheel over-runs to return the drive wheel to starting position.

2. In an automatic hay baler, a bale case through which bales are progressively moved in one direction as they are formed, a shaft extending transverse to said one direction, a metering wheel fixedly mounted on said shaft and projecting into said bale case, said shaft and metering wheel being rotatable responsive to bale movement, a movable and shiftable trip arm, a drive wheel mounted on said shaft, said drive wheel having a roughened periphery, means biasing said trip arm into engagement with said periphery whereby when the drive wheel rotates in one direction said trip arm moves, means on said trip arm whereby when the arm has been moved a predetermined amount said biasing means shifts the arm, and means connecting said drive wheel to said shaft whereby the drive wheel may rotate with the shaft and may over-run said shaft in said one direction responsive to shifting of said trip arm, said last named means comprising a roller mounted on said shaft and fixed relative thereto, said roller having an elongate slot therein, a pin on said drive wheel projecting through said slot and parallel to said shaft, said pin assuming a position in one end of said slot on rotation of said shaft and providing a driving connection between said pin and drive wheel, said drive wheel being free however to overrun the shaft an amount equal to the movement of said pin to the end of said slot opposite said one end, and a spring interposed between said drive wheel and said roller and placed under load when said drive wheel overruns.

3. In an automatic hay baler, a bale case through which bales are progressively moved as they are formed, a shaft, a metering wheel fixedly mounted on said shaft and projecting into said bale case, said shaft and metering wheel being rotatable responsive to bale movement, a movable and shiftable trip arm, a drive wheel mounted on said shaft, means biasing said trip arm into engagement with the periphery of said drive wheel whereby as the drive wheel is driven the trip arm is moved, means on said trip arm whereby when the arm has been moved a predetermined amount said biasing means shifts the arm, and means connecting said drive wheel to said shaft whereby the drive wheel may rotate in one direction with the shaft and overrun the shaft in said one direction responsive to shifting of said trip arm, said last named means comprising a pair of cup-shaped members fixedly mounted on said shaft, a spacer separating said members, said drive wheel being freely rotatable on said spacer, one member of said pair of members having an arcuate slot concentric to the rotational axis of said shaft, a pin on said drive wheel projecting through said slot, said pin assuming a position in one end of said slot on rotation of the shaft, and providing a driving connection between said shaft and drive wheel, said drive wheel being free however to overrun the shaft an amount equal to the movement of said pin to the end of said slot opposite said one end, and a torsion spring interposed between said drive wheel and one of said pair of members operative to store energy when said drive wheel overruns to return the drive wheel to said one end of said slot.

References Cited in the file of this patent

UNITED STATES PATENTS

| | | |
|---|---|---|
| 1,091,296 | Curnutt | Mar. 24, 1914 |
| 2,058,431 | Eschenbacker | Oct. 27, 1936 |
| 2,701,517 | Hauswirth | Feb. 8, 1955 |
| 2,720,159 | Seltzer | Oct. 11, 1955 |

FOREIGN PATENTS

| | | |
|---|---|---|
| 705,457 | Germany | Apr. 29, 1941 |
| 814,065 | Germany | Sept. 20, 1951 |